July 11, 1961
E. A. STALKER
2,991,929
SUPERSONIC COMPRESSORS
Filed May 12, 1955
2 Sheets-Sheet 1
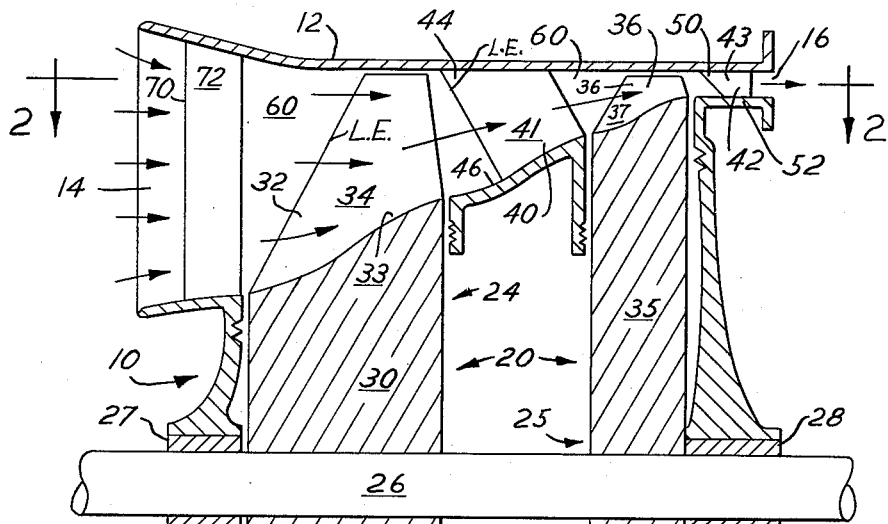
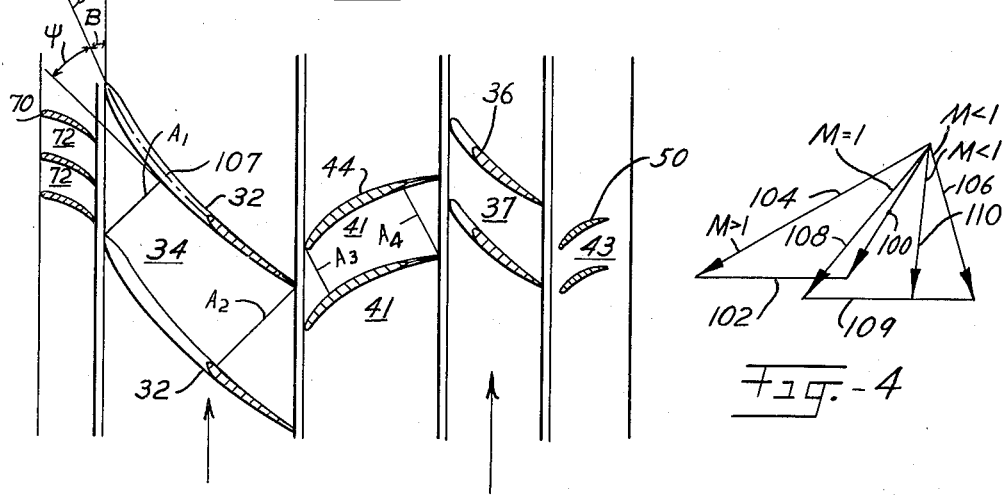
INVENTOR.
Edward A. Stalker

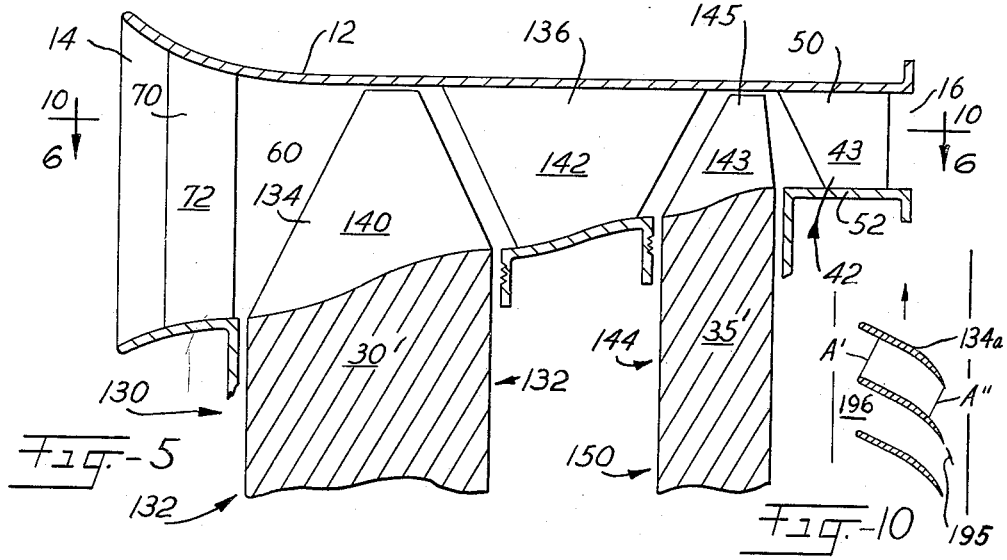
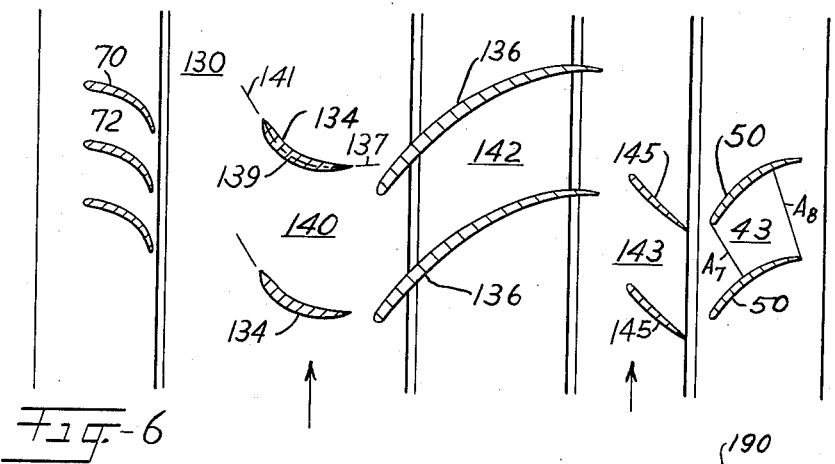
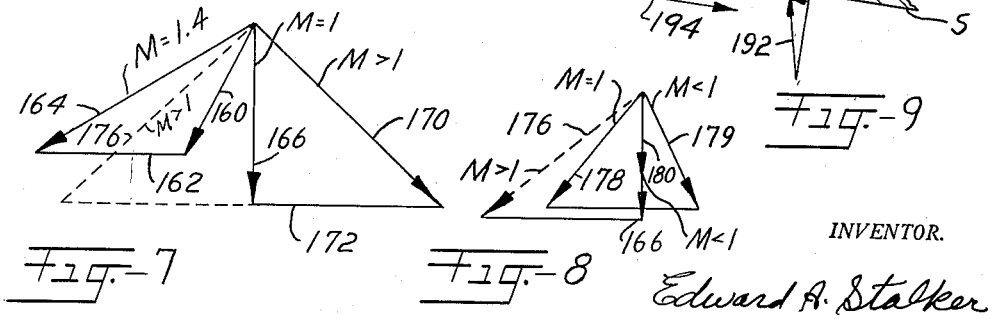

United States Patent Office 2,991,929
Patented July 11, 1961

2,991,929
SUPERSONIC COMPRESSORS
Edward A. Stalker, Bay City, Mich., assignor to The Stalker Corporation, a corporation of Michigan
Filed May 12, 1955, Ser. No. 507,881
14 Claims. (Cl. 230—120)

This invention relates to elastic fluid rotary compressors.

An object of the invention is to provide a machine capable of achieving very high pressure rises per stage.

Another object is to provide a machine for operating in the supersonic range of relative fluid flow without strong, that is normal, shock waves.

Other objects will appear from the following description, appended claims and accompanying drawings.

The above objects are accomplished by the means illustrated in the accompanying drawings in which—

FIG. 1 is a fragmentary axial section through a compressor according to this invention;

FIG. 2 is a fragmentary section of the blading on line 2—2 in FIG. 1;

FIG. 3 is a developed side view of a portion of a blade;

FIG. 4 is a vector diagram of the flow through the first stage;

FIG. 5 is a fragmentary axial section of an alternate form of a compressor according to this invention;

FIG. 6 is a fragmentary development of the compressor blading on line 6—6 in FIG. 6;

FIG. 7 is a vector diagram representative of the flow in the first stage of a compressor like that of FIG. 5;

FIG. 8 is a vector diagram representative of the flow in the last stage of a compressor like that of FIG. 5;

FIG. 9 is a fragment of a compressor case illustrating the effect of fluid centrifugal pressure on the main flow through the case; and FIG. 10 shows an alternate form of blading.

In this invention, the compressor operates with fluid speeds relative to the blades greater than sonic speed in the local fluid, that is the fluid closely adjacent to the blades. The leading edges (L.E.) of the blades are inclined so that the velocity components normal to the leading edges are subsonic and accordingly shock waves are not generated upon entrance of the fluid to the rotor passages between the blades. The fluid in the passage is however supersonic relative to the blades.

These passages between the rotor blades are area convergent with respect to their cross sectional areas. That is the exit cross sectional area is smaller than the inlet cross sectional area. The ratio of these areas is preferably such that the supersonic flow speed in each passage is reduced to sonic speed at the passage exit, that is to a Mach number of 1, ($M=1$), at the design condition of operation of the rotor or closely thereto.

The stator blades downstream adjacent to the rotor also preferably have inclined leading edges (L.E.) to receive the flow of fluid at supersonic velocity without generating shock waves. The passages between the blades of some stators are also area convergent. In some applications the flow relative to the stators is preferably subsonic although the flow is supersonic relative to the rotor.

As many stages of rotor and stator blading may be used as desired, operating under the above described conditions.

Referring now to the drawings, a compressor according to this invention is indicated generally as 10 in FIGS. 1 and 2. It comprises the case 12 having the inlet 14 and exit 16. A rotor assembly 20 comprises the rotors 24 and 25 positioned in axially tandem relation. The assembly is mounted in the case for rotation about its axis by shaft 26 in bearings 27 and 28.

Rotor 24 comprises the hub 30 carrying the blades 32 on its rim 33 peripherally spaced with the rotor flow passages 34 between them.

Rotor 25 comprises the hub 35 and the blades 36 peripherally spaced with the rotor flow passages 37 between them.

The spans of the blades correspond with the general radial direction.

Stators 40 and 42 are positioned respectively on the downstream side of each rotor. Stator 40 comprises the blades 44 supported on the case and in turn supporting the stator ring means 46. Stator 42 likewise comprises stator blades 50 and ring means 52. Stator 40 has the stator passages 41 and stator 42 has the stator passages 43.

The case and ring means are normally split along an axial plane for assembly purposes.

The rotor assembly and stators define with the case, an annular duct means 60 across which the rotor and stator blades extend dividing the duct means into the plurality of rotor and stator flow passages between the blades.

Inlet guide vanes 70 may also be incorporated ahead of the first rotor with flow passages 72 between them. They are particularly useful where they direct the flow against the direction of the rotor rotation so that a low rate of rotation may be used.

In operation air or other elastic fluid enters the inlet 14 and flows between the inlet guide vanes. See FIGS. 1 and 2. The velocity vector for fluid leaving the vanes is 100 for vane and blade sections near their mid spans. See FIG. 4. The peripheral velocity of the rotor blades 32 at the section is vector 102 which combined with vector 100 gives the supersonic relative velocity vector 104 approaching the rotor blades. The Mach number M is greater than 1 (that is $M>1$).

In this arrangement of the blades and their configurations the fluid may approach the rotor blades 32 at a Mach number M of about 1.4, FIG. 3, for instance. The leading edge (L.E.) of each blade is then inclined at an angle $\theta$ of somewhat more than 45 degrees (or even more) (FIG. 3) so no shock waves are generated in the flow in entering the pasages 34 between the blades. This is true since the component normal to the leading edge has the magnitude less than $V \sin \theta = .70V$ or the Mach number of the component is less than ($1.4 \cos \theta = 1.0$).

The angle $\theta$ is measured between a line in the plane normal to the axis and a line through the leading edge, or measured on the blade in the uncurved or developed state shown in FIG. 3.

To be significant the angle $\theta$ should be as large as 25 degrees and preferably in the range of 30 to 60 degrees. The larger values are preferably used in the later or downstream stages where the span (radial length) is smaller and the larger angle $\theta$ does not unduly elongate the compressor.

Also larger angles of $\theta$ can be used in the first or other stages when the inlet angle $\beta$ FIG. 2 is small without unduly lengthening the machine. Inlet angles less than 45 degrees are preferred for values of $\theta$ greater than 45 degrees.

Preferably the reduction in the cross sectional areas of both rotor and stator passages is obtained by contouring the rotor hub rim 33 or the stator ring 46 so that the rearward portions of the surfaces are at increased distances from the axis of rotation.

Preferably each passage increases in cross sectional area somewhat for a short distance back from the leading edges of the blades to accelerate the supersonic flow and then decreases toward the exit to a value less than the inlet cross sectional area so that the velocity of the fluid at the exit is closely equal to the velocity of sound in the fluid at this exit. That is the Mach number M is closely equal to one. The deceleration of the supersonic velocity to Mach number 1 is accompanied by a rise in static pressure.

The fluid enters the stator passages at a Mach number M along the vector 106 which is the resultant of vector 108 for fluid leaving rotor 24 and the rotor peripheral vector 109. Vector 109 is larger than 102 because the mid radial section is at a greater radius.

If the Mach number of the flow entering the rotor is about 1.4 the compression ratio occurring in the rotor passages will be about 3. If the relative velocity entering these passages is 1540 feet per second at atmospheric pressure and mass density of 0.00237 slug per cubic foot, the leaving velocity from the rotor relative thereto will be closely 1305 f.p.s. (vector 108) which is closely the velocity of sound in the fluid at the rotor passage exit. Then the velocity entering the stator (vector 110) is subsonic since it is smaller than vector 108. The area ratio $A_2/A_1$ is about 0.56 for the above conditions.

As long as the camber angle $\psi$, FIG. 2, is closely equal to or less than one-half angle D (the angle between the tangent to the mean chamber line at the blade nose and the axial direction) vector 106 will be smaller than vector 108 and accordingly has M less than 1 so that the flow may be diffused to a lower velocity in expanding stator passages. The angle $\psi$ is measured between the tangents to the mean camber line 107 at its leading and trailing edges.

Thus by the devices described the rotor is operable at a supersonic speed without normal (strong) shock waves with a high pressure ratio per stage of closely 3 and the first stage delivers the fluid at this pressure at subsonic speed from the stator without normal or strong shock losses. The second stage comprising rotor 25 and stator 40 operate in like manner. That is the flow into rotor 25 is supersonic and the flow from stator 42 is subsonic. Thus the compressor as a whole achieves high pressure ratios, more than 9 for two stages for the compressor described, by employing supersonic inlet velocities to the rotor passages and yet delivers the compressed fluid at the compressor exit without normal or strong shock losses in either the rotors or the stators.

In another form of the invention the first and second rotors operate with supersonic velocity of the fluid entering into the rotor passages. The entrance velocity at the first stator is also supersonic but the second or last stator has a subsonic entrance velocity. FIGS. 5–8 refer to such a compressor.

The compressor is indicated generally as 130 and is similar to the compressor 10 of FIG. 1 except that the curvature of the blades and the areas of the passages between blades are different.

The rotor blades 134 of first rotor 132, FIG. 5, are curved to discharge fluid in the axial direction relative to the rotor. The stator blades 136 are preferably curved to discharge also in substantially the axial direction. The first rotor passages are 140 and the first stator passages are 142. The hubs are 30' and 35'.

The second rotor 150, FIG. 5, is similar to rotor 25 in that the blades are curved less than those of rotor 132.

In FIG. 6 the direction of the rear part of the blade, as indicated by the tangent 137 to the mean camber line 139 at its rear end, is directed more along the direction of the axis of rotation than along the direction of the front part of the blade as indicated by the tangent 141 to the mean camber line at its front end.

The passages 140 of the first rotor are area convergent so that the flow is decelerated to a Mach number of about 1.0. The passages 142 of the first stator are also area convergent to decelerate their flow to a Mach number of about 1.0 at their exits.

The passages 143 between the blades 145 of the second rotor 144 are also area convergent to decelerate the supersonic flow to closely $M=1$. However the flow from the second rotor relative to the case is preferably subsonic and so is subsonic into the second stator ($M<1$) wherefore the passages of the second stator are area divergent to diffuse and further decelerate the fluid flow to useful velocities and pressures. As shown in FIG. 6 the cross sectional area $A_8$ is greater than $A_7$.

A vector diagram for a first rotor and stator is shown in approximate form in FIG. 7. The vector of the flow from the inlet guide vanes is 160. The peripheral vector is 162. The relative vector is 164 for the fluid entering the rotor passages. The leaving vector is 166, substantially axial in direction.

The relative inlet Mach No. (M) of 164 may be 1.4, for instance. The exit Mach No. of vector 166 is 1. Then the inlet vector to the stator passages 142 is 170 at a Mach No. greater than 1, being the resultant of 166 and the peripheral velocity 172. The velocity leaving the stator passages is substantially the same as 166 at $M=1$ and the relative inlet velocity vector to the second rotor is 176 at $M>1$.

In FIG. 8 the inlet vector 176 is repeated. The flow velocity in the second rotor passages is reduced at their exit to vector 178 at $M=1$ leading to an inlet vector 179 at entrance to the stator of $M<1$. The vector for the exit of the stator is 180 also at $M<1$.

The blades should be relatively thin and may have relatively sharp leading edges as shown by blades 134 in FIG. 6.

The compressor of FIGS. 5–8 develops a greater pressure ratio in the first stage than does the first stage of the compressor of FIG. 1. This is accomplished without shock in the rotor or stator. Thus the compressor as a whole operates supersonically and delivers fluid at a very high pressure ratio and at subsonic speed—all without shocks to reduce the supersonic velocities to subsonic values.

When the blades are curved along their chordwise lengths, the cross sectional widths increase. To have decreasing cross sectional areas the depths (in the radial directions) of the passages must decrease rearward, that is in the downstream direction. For instance with a supersonic flow at Mach No. 1.4, the ratio of exit area to inlet area should be 0.56 to reduce the flow velocity to Mach 1, that is to the local sonic velocity. Then the passage exit depth should be less than 0.56 times the depth at the passage inlet where the blades are curved as shown in FIG. 2.

It is important that the inner surface of the case have little and preferably no inclination toward the axis along the downstream (rearward) direction. See FIG. 9. If this surface S were inclined rearwardly toward the axis as in FIG. 9 there would be a component 190 of the fluid centrifugal pressure indicated by vector 192 acting forward, that is upstream, along the case which would oppose the outer part of the main flow (vector 194) and divert it away from the case. This could have a serious effect on the efficiency of a supersonic compressor according to this invention where there is also a large static pressure increase downstream along each rotor passage if the inward inclination were large.

Where the rotor blades have a large amount of curvature substantially directing the flow from the rotor passages axially relative thereto, the flow approaching the stators may readily be made to be supersonic relative to them. Accordingly it is desirable to provide substantially inclined leading edges for the stator blades. However where the rotor blades have a small amount of curvature, the velocity of the fluid approaching the stator blades may be subsonic at the design condition and accordingly the leading edges of the blades need not be inclined. Substantial inclination is however still advantageous for off design conditions where the angles of attack become large either positively or negatively since the flow may reach supersonic values locally in turning about the noses of the blades.

The stator blades may be inclined rearwardly but preferably have their leading edges inclined forward at the outer ends so that the angles of incidence at the outer ends are retained at values unmagnified by the induced flow about the leading edge.

It is preferable that the exit cross sectional area of each passage has a magnitude relative to the inlet cross sectional area that reduces the supersonic flow to a Mach No. closely equal to 1. However useful results can be achieved with lesser reductions in the exit cross sectional areas. For instance in the example mentioned earlier the ratio of areas is 0.56 for an exit Mach No. 1 relative to the rotor. This ratio might be increased to 0.70 and yet produce significant increase in pressure at an acceptable efficiency for some uses.

FIG. 10 shows blades 134a of another form which could be mounted on a rotor. The blades have their rear portions curved rearward relative to the direction of rotation, indicated by vector 195. This makes the cross sectional widths at the exits of the passages 196 between blades less than the cross sectional widths at the inlets. Accordingly the exit cross sectional areas A" are smaller than the inlet cross sectional areas A' for less tapering of the passages in axial planes. These blades present their convex sides toward the direction of rotation and accordingly may be said to be reversely curved. With reverse curvature in the blades little or no curvature is required in the rim surface of the hub in axial planes. This is an advantage since the pattern of Mach waves is simpler and adverse effects of these waves at the case are greatly reduced or eliminated.

It is important particularly in engines for aircraft that the compressor rotors can be staged and that the overall length of the compressor be small. Small axial lengths of the compressor rotor are readily obtained by the configuration of FIG. 10. In it the maximum axial lengths of the rotor passages are substantially less than the maximum radius of the rim surface of the hub and preferably less than half said radius.

It will now be clear that this invention discloses novel means of compressing elastic fluid. In one form of the invention the fluid is received at supersonic velocity into the rotor passages but shock losses are avoided at the entrances of the passages by inclining the leading edges so that the component of flow velocity normal to the leading edge has a subsonic value. The flow is then decelerated by area convergent rotor passages to closely sonic velocity, that is, close to a Mach No. of 1. The rotor blades are formed to direct the flow at such an angle that the flow velocity relative to the stators is at a velocity relative thereto less than the local sonic velocity, that is, at a Mach No. less than 1. The stator passages may then have increasing cross sectional areas to diffuse the subsonic flow to large static pressures. This type of stage is particularly adapted to a single stage compressor or the last stage of a multi-stage compressor.

In another form of the invention the first or an upstream rotor discharges the flow at supersonic velocity relative to the stator blades and these have inclined leading edges so that the velocity components normal thereto are of subsonic magnitude. The stator has passages of decreasing cross sectional areas to decelerate the supersonic flow and increase the static pressure. The flow is decelerated to sonic velocity at the stator passage exits. Preferably the last stage of a multi-stage directly follows an upstream stage like that just described (in this paragraph). This last stage should be similar to the stage described in the paragraph next above. That is it receives fluid into the rotor at supersonic speed and into the stator at subsonic speed. This enables a multi-stage compressor to operate at supersonic velocities relative to the rotors and yet to deliver the compressed flow at subsonic velocities without losses due to normal shock waves which are the usual expedient for getting from supersonic velocities to subsonic velocities.

Compressors of this type produce many times the pressure rise per stage of conventional axial flow machines, at substantially the same efficiencies and accordingly are important in industry because of their lowered cost and in aviation particularly because of their smaller size and weight.

While I have illustrated specific forms of the invention, it is to be understood that variations may be made therein and that I intend to claim my invention broadly as indicated by the appended claims.

I claim:

1. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows of said fluid thereacross with components of fluid speeds normal to said edges less than sonic speed, each said rotor passage having decreasing cross sectional areas rearward with the exit cross sectional area sufficiently less than the inlet cross sectional area to decelerate said supersonic flows to substantially sonic speed relative to said rotor, the inner wall of said case means facing said blades having substantially no inclination toward the axis in the downstream direction, a stator positioned in said case means downstream adjacent to said rotor comprising a plurality of peripherally spaced stator blades with stator flow passages therebetween for receiving said flows from said rotor passages, said rotor in operation projecting said flows into said stator passages at supersonic speeds relative thereto, each said stator blade having a forwardly inclined leading edge to receive said relative flow thereacross with a velocity component normal to said edge of subsonic relative speed to avoid significant shock wave formation, said stator passages having decreasing cross sectional areas rearward therealong with the exit cross sectional area thereof sufficiently less than the inlet cross sectional area thereof to decelerate said stator passage flow to substantially sonic value.

2. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows of said fluid thereacross with components of fluid speed normal to said edges less than sonic speed, each said rotor passage having decreasing cross sectional areas rearward with the exit cross sectional area sufficiently less than the inlet cross sectional area to decelerate said supersonic flows to substantially sonic speed relative to said rotor, a stator positioned in said case means downstream adjacent to said rotor comprising a plurality of peripherally spaced stator blades with stator flow passages therebetween for receiving said flows from said rotor passages, said rotor in operation projecting said flows into said stator passages at supersonic speeds relative thereto, each said stator blade having an inclined leading edge to receive said relative flow with a velocity component normal to said edge of subsonic relative speed to avoid significant shock wave formation, said stator passages having decreasing cross sectional areas rearward therealong with the exit cross sectional area thereof sufficiently less than the inlet cross sectional area thereof to decelerate said stator passage flow to substantially sonic value.

3. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows of said fluid thereacross with components of fluid speed normal to said edges less than sonic speed, each said rotor passage having decreasing cross sectional areas rearward with the exit cross sectional area sufficiently less than the inlet cross sectional area to decelerate said supersonic flows to substantially sonic speed, the inner wall of said case means facing said blades having substantially no inclination toward the axis in the downstream direction, a stator positioned in said case means downstream adjacent to said rotor comprising a plurality of peripherally spaced stator blades with stator flow passages therebetween for receiving said flows from said motor passages, said rotor in operation projecting said flows into said stator passages, each said stator blade having an inclined leading edge to receive said relative flows with a velocity component normal to said edge at subsonic relative speed to avoid significant shock wave formation, said stator passages having decreasing cross sectional areas rearward therealong with the exit cross section area thereof sufficiently less than the inlet cross sectional area thereof to substantially decelerate said stator passage flow.

4. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows thereacross with components of fluid speed normal to said edges less than sonic speeds, each said passage having decreasing cross sectional areas rearward with the exit cross sectional area less than the inlet cross sectional area to decelerate said supersonic flow and increase its static pressure, the inner wall of said case means facing said blades having substantially no inclination toward the axis in the downstream direction, a stator positioned in said case downstream adjacent to said rotor comprising a plurality of peripherally spaced stator blades with stator flow passages therebetween for receiving said flows from said rotor passages, said rotor in operation projecting said flows into said stator passages.

5. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows thereacross with components of fluid speed normal to said edges less than sonic speed, each said passage having decreasing cross sectional areas rearward with the exit cross sectional area less than the inlet cross sectional area to decelerate said supersonic flows, a stator positioned in said case means downstream adjacent to said rotor comprising a plurality of peripherally spaced stator blades with stator flow passages therebetween for receiving said flows from said rotor passages, said rotor in operation projecting said flows into said stator passages, each said stator blade having an inclined leading edge to receive said relative flow with a velocity component normal to said edge at subsonic relative speed to avoid significant shock wave formation.

6. In combination in an axial flow compressor, a case means, and a rotor mounted in said case means for rotation about an axis to impel elastic fluid therethrough, said rotor comprising a hub means and a plurality of peripherally spaced curved blades carried thereon with rotor flow passages between said blades, said rotor being rotatable at supersonic fluid speeds relative to said blades and passages, said blades having their spans extending in the general radial direction and having inclined leading edges to receive supersonic relative flows of said fluid thereacross with components of fluid speed normal to said edges less than sonic speed, each said blade being curved along its chordwise length with the aft portion thereof directed more along said axis of rotation than along the direction of the nose portion of said blade, each said rotor passage having decreasing cross sectional areas rearward with the exit cross sectional area less than the inlet cross sectional area to decelerate said supersonic flows, a stator positioned in said case means downstream adjacent to said rotor comprising a plurality of peripherally spaced stator blades with stator flow passages therebetween for receiving said flows from said rotor passages, said rotor in operation projecting said flows into said stator passages at supersonic speeds relative thereto, each said stator blade having an inclined leading edge to receive said relative flow thereacross with a velocity component normal to said edge at subsonic relative speed to avoid significant shock wave formation, said stator passages having decreasing cross sectional areas rearward therealong with the exit cross sectional area thereof less than the inlet cross sectional area thereof to decelerate said stator passage flows.

7. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having leading edges inclined rearward radially outward therealong, the angles between radial lines from said axis through said leading edge along a major portion of said edge being greater than 25 degrees to receive supersonic relative flows of said fluid thereacross with components of fluid speeds normal to said edges less than sonic speed, each said rotor passage having decreasing cross sectional areas rearward with the exit cross sectional area sufficiently less than the inlet cross sectional area to decelerate said supersonic flows to substantially sonic speed relative to said rotor, a stator positioned in said case means downstream adjacent to said rotor comprising a plurality of peripherally spaced stator blades with stator flow passages therebetween for receiving said flows from said rotor passages, said rotor in operation projecting said flows into said stator passages at supersonic speeds relative thereto, each said stator blade having a forwardly inclined leading edge to receive said relative flow thereacross with a velocity component normal to said edge of subsonic relative speed to avoid significant shock wave formation, said stator passages having decreasing cross sectional areas rearward therealong with the exit cross sectional area thereof sufficiently less than the inlet cross sectional area thereof to decelerate said stator passage flow to substantially sonic value.

8. In combination in an axial flow compressor, a case means, and a rotor mounted in said case means for rotation about an axis to impel elastic fluid therethrough, said rotation during operation of said compressor creating centrifugal pressure in said fluid against said case means, said rotor comprising a hub means defining an annular duct with said case means, a plurality of peripherally spaced blades carried on said hub means and extending across said duct defining rotor flow passages between said blades bounded by the portion of the inner surface of said case means opposite said blades, said rotor being rotatable at supersonic fluid speeds relative to said blades and passages to induce a flow of said fluid through each said passage, said blades having inclined leading edges to receive supersonic relative flows thereacross with components of fluid speed normal to said edges less than sonic speeds, each said passage having decreasing cross sectional areas rearward with the exit cross sectional area less than the inlet cross sectional area to decelerate said supersonic flow and increase the static pressure thereof in each said passage, said portion of the inner surface of said case means being substantially parallel to said axis to facilitate the axial flow therealong under the action of centrifugal pressure in said fluid, a stator positioned in said case means downstream adjacent to said rotor comprising a plurality of peripherally spaced stator blades with stator flow passages therebetween for receiving said flows from said rotor passages, said rotor in operation projecting said flows into said stator passages.

9. In combination in an axial flow compressor, a case means, and a rotor mounted in said case means for rotation about an axis to impel elastic fluid therethrough, said rotor comprising a hub means defining an annular duct with said case means, a plurality of peripherally spaced blades carried on said hub means and extending across said duct defining rotor flow passages between said blades bounded by the inner surface of said case means, said rotor being rotatable at supersonic fluid speeds relative to said blades and passages to induce a flow of said fluid through each said passage, said blades having inclined leading edges to receive supersonic relative flows thereacross with components of fluid speed normal to said edges less than sonic speeds, the angle between radial lines from said axis through said leading edge and said leading edge being greater than 25°, said blades being rearwardly curved chordwise therealong and cooperating with said case means and said hub means to provide each said rotor flow passage with decreasing widths and cross sectional areas rearward with the exit cross sectional area thereof less than the inlet cross sectional area thereof to decelerate said supersonic flow and increase the static pressure thereof in each said passage.

10. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows thereacross with components of fluid speed normal to said edges less than sonic speeds, each said passage having decreasing cross sectional areas rearward with the exit cross sectional area less than the inlet cross sectional area to decelerate said supersonic flow and increase its static pressure, each said blade having its rear portion directed rearward with respect to the direction of rotation to project said flow from said rotor at subsonic speed relative to said case means, a stator positioned in said case means downstream adjacent to said rotor comprising a plurality of peripherally spaced stator blades with stator flow passages therebetween for receiving said flows from said rotor passages, said rotor in operation projecting said flows into said stator passages at subsonic speed relative thereto, each said stator passage having increasing cross-sectional areas with the exit cross-sectional area thereof greater than the inlet cross-sectional area to decelerate said subsonic flow and increase the static pressure thereof.

11. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges, the angle between radial lines from said axis through said leading edge and said leading edge being greater than 25 degrees to receive supersonic relative flows of said fluid thereacross with components of fluid speed normal to said edges less than sonic speeds, each said passage having decreasing cross-sectional areas rearward with the exit cross-sectional area less than the inlet cross-sectional area to decelerate said supersonic flow and increase its static pressure, each said blade having its rear portion directed rearward with respect to the direction of rotation to project said flow from said rotor at subsonic speed relative to said case means, a stator positioned in said case means downstream adjacent to said rotor comprising a plurality of peripherally spaced stator blades with stator flow passages between said stator blades for receiving said flows from said rotor passages, said rotor in operation projecting said flows into said stator passages at subsonic speed relative thereto, each said stator passage having increasing cross-sectional areas with the exit cross sectional area thereof greater than the inlet cross sectional area to decelerate said subsonic flow and increase the static pressure thereof.

12. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows thereacross with components of fluid speed normal to said edges less than sonic speeds, each said passage having decreasing cross sectional areas rearward with the exit cross sectional area less than the inlet cross sectional area to decelerate said supersonic flow and increase its static pressure, a stator positioned in said case downstream adjacent to said rotor comprising a plurality of peripherally spaced stator blades with stator flow passages therebetween for receiving said flows from said rotor passages, each said rotor blade having its rear portion directed opposite to the direction of rotor rotation so that said fluid is discharged from said rotor passages with a velocity component opposite to the direction of said rotor rotation producing a resultant velocity of said fluid relative to said stator blades of subsonic magnitude referred to the velocity of sound in said fluid at issuance from said passages, said rotor in operation projecting said flows into said stator passages with said velocity of subsonic magnitude relative thereto.

13. In combination in an axial flow compressor, a case means, and a rotor mounted in said case means for rotation about an axis to impel elastic fluid therethrough, a plurality of peripherally spaced inlet guide vanes angularly positioned in said case means upstream of said rotor to direct said fluid in a direction opposite to the direction of rotation of said rotor, said rotor comprising a hub means and a plurality of peripherally spaced blades carried thereon with rotor flow passages between said blades, said rotor and inlet guide vanes cooperating so that said rotor blades are rotatable at supersonic fluid speeds relative to said fluid from said inlet guide vanes while being rotated at a substantially lower speed relative to said case means, said blades having their spans extending in the general radial direction and having inclined leading edges to receive supersonic relative flows thereacross with components of fluid speed normal to said edges less than sonic speeds, the angle between a line in the plane normal to said axis and a line through said leading edge being greater than 25 degrees, each said passage having decreasing cross sectional areas rearward with the exit cross sectional area less than the inlet cross sectional area to decelerate said supersonic flow and increase its static pressure, a stator positioned in said case downstream adjacent said rotor comprising a plurality of peripherally spaced stator blades with stator flow passages therebetween for receiving said flows from said rotor passages, each said rotor blade having its rear portion directed opposite to the direction of rotor rotation so that said fluid is discharged from said rotor passages with a velocity component opposite to the direction of said rotor rotation producing a resultant velocity of said fluid relative to said stator blades of subsonic magnitude referred to the velocity of sound in said fluid at issuance from said passages, said inlet guide vanes and rotor cooperating to produce supersonic fluid speeds relative to said rotor blades immediately upstream thereof and subsonic fluid speeds relative to said case means and stator blades between said rotor and said stator, said rotor in operation projecting said flows into said stator passages with said velocity of subsonic magnitude.

14. In combination in an axial flow compressor, a case means, and a rotor mounted in said case means for rotation about an axis to impel elastic fluid therethrough, said rotor comprising a hub means and a plurality of peripherally spaced blades carried thereon with rotor flow passages between said blades, said rotor being rotatable at supersonic fluid speeds relative to said blades and passages, said blades having their spans extending in the general radial direction and having inclined leading edges to receive supersonic relative flows thereacross with components of fluid speed normal to said edges less than sonic speeds, the angle between a line in the plane normal to said axis and a line through said leading edge being greater than 25 degrees, each said rotor passage having decreasing cross sectional areas rearward with the exit cross sectional area less than the inlet cross sectional area to decelerate said supersonic flow and increase its static pressure, a stator positioned in said case means downstream adjacent to said rotor comprising a plurality of peripherally spaced stator blades with stator flow passages therebetween for receiving said flows from said rotor passages, each said blade having its rear portion directed rearward with respect to the direction of rotor rotation to project said flow from said rotor at subsonic speed relative to said stator blades, said rotor in operation projecting said flows into said stator passages at subsonic velocity relative thereto, each said stator passage having increasing cross sectional areas with the exit cross sectional area thereof greater than the inlet cross sectional area to decelerate said subsonic flow and increase the static pressure thereof.

References Cited in the file of this patent

UNITED STATES PATENTS

| | | |
|---|---|---|
| 2,663,493 | Keast | Dec. 22, 1953 |
| 2,689,680 | Lovesey | Sept. 21, 1954 |